United States Patent
Takano et al.

(10) Patent No.: US 9,781,644 B2
(45) Date of Patent: *Oct. 3, 2017

(54) METHOD FOR PERFORMING HANDOVER, USER EQUIPMENT, AND RADIO COMMUNICATION SYSTEM

(71) Applicant: SONY CORPORATION, Tokyo (JP)

(72) Inventors: Hiroaki Takano, Saitama (JP); Yuichi Morioka, Tokyo (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,378

(22) Filed: Feb. 17, 2017

(65) Prior Publication Data

US 2017/0164254 A1 Jun. 8, 2017

Related U.S. Application Data

(63) Continuation of application No. 15/136,507, filed on Apr. 22, 2016, now Pat. No. 9,629,047, which is a
(Continued)

(30) Foreign Application Priority Data

Dec. 16, 2009 (JP) ................................. 2009-285374

(51) Int. Cl.
*H04W 36/08* (2009.01)
*H04W 74/00* (2009.01)
(Continued)

(52) U.S. Cl.
CPC ....... *H04W 36/08* (2013.01); *H04W 36/0016* (2013.01); *H04W 72/0453* (2013.01); *H04W 74/008* (2013.01); *H04W 74/0833* (2013.01)

(58) Field of Classification Search
CPC ............. H04W 36/0011; H04W 36/08; H04W 74/0866; H04W 74/08; H04W 74/0833;
(Continued)

(56) References Cited

U.S. PATENT DOCUMENTS

2002/0080749 A1* 6/2002 Terry .................. H04B 7/2681
370/336
2007/0293224 A1 12/2007 Wang et al.
(Continued)

FOREIGN PATENT DOCUMENTS

| CN | 101388722 A | 3/2009 |
| EP | 2 101 538 A2 | 9/2009 |
| JP | 2009-232293 | 10/2009 |

OTHER PUBLICATIONS

3GPP TSG RAN WG2 Meeting #68 R2-096499, "CC management in CA," CATT, Total 6 pages, (Nov. 9-13, 2009).
(Continued)

*Primary Examiner* — Charles C Jiang
*Assistant Examiner* — Oussama Roudani
(74) *Attorney, Agent, or Firm* — Oblon, McClelland, Maier & Neustadt, L.L.P.

(57) ABSTRACT

A mobile station in a wireless communication network. The mobile station includes a radio communication that transmits an access request message to a base station via a first communication resource, and receives a timing adjustment in response to the access request message from the base station. The mobile station also includes an adjustment value storage unit that stores the timing adjustment, and a control unit that adjusts access timing corresponding to a second communication resource based on the timing adjustment value stored in the adjustment value storage unit. The radio
(Continued)

communication unit then communicates with the base station via the first communication resource and the second communication resource.

14 Claims, 15 Drawing Sheets

Related U.S. Application Data continuation of application No. 13/514,163, filed as application No. PCT/JP2010/007037 on Dec. 2, 2010, now Pat. No. 9,374,838.

(51) Int. Cl.
*H04W 74/08* (2009.01)
*H04W 72/04* (2009.01)
*H04W 36/00* (2009.01)

(58) Field of Classification Search
CPC ......... H04W 36/0055; H04W 36/0072; H04W 36/0077; H04W 36/30; H04W 52/0206; H04L 5/0053
See application file for complete search history.

(56) References Cited

U.S. PATENT DOCUMENTS

| | | |
|---|---|---|
| 2008/0189970 A1 | 8/2008 | Wang et al. |
| 2008/0227454 A1* | 9/2008 | Damnjanovic ... H04W 36/0055 455/436 |
| 2009/0310563 A1* | 12/2009 | Chou ................. H04L 27/0006 370/331 |
| 2010/0080155 A1 | 4/2010 | Suzuki et al. |
| 2010/0103821 A1 | 4/2010 | Palanki |
| 2010/0272067 A1* | 10/2010 | Lu ..................... H04W 36/0072 370/331 |
| 2012/0002617 A1* | 1/2012 | Vujcic ................ H04W 74/002 370/329 |

OTHER PUBLICATIONS

3GPP TSG RAN WG1 #57bis R1-092536, "Synchronization channel and system information for Carrier Aggregation," Panasonic, Total 4 pages, (Jun. 29-Jul. 3, 2009).
3GPP TSG RAN WG2 Meeting #67 R2-094731, "Intra LTE-A UE Handover Procedure Inter-eNB for CA," Huawei, Total 5 pages, (Aug. 24-Aug. 28, 2009).
International Search Report Issued Dec. 28, 2010 in PCT/JP10/007037 filed Dec. 2, 2010.
Japanese Office Action issued Oct. 8, 2013, in Japan Patent Application No. 2009-285374.
"Handover for Carrier Aggregation", CATT, R2-093722, 3GPP TSG RAN WG2 Meeting #66bis, (Discussion and Decision), Jun. 29-Jul. 3, 2009, 3 pages.
Combined Chinese Office Action and Search Report issued Apr. 3, 2014, in Chinese Patent Application No. 201080056945.5 (with English translation).
Extended Search Report issued Sep. 24, 2015, in European Patent Application No. 10837238.4.
Nokia Corporation et al., "RACH and carrier aggregation," 3GPP TSG-RAN WG2 Meeting #68, Nov. 2009, 3 pages.

* cited by examiner

[Fig. 1]
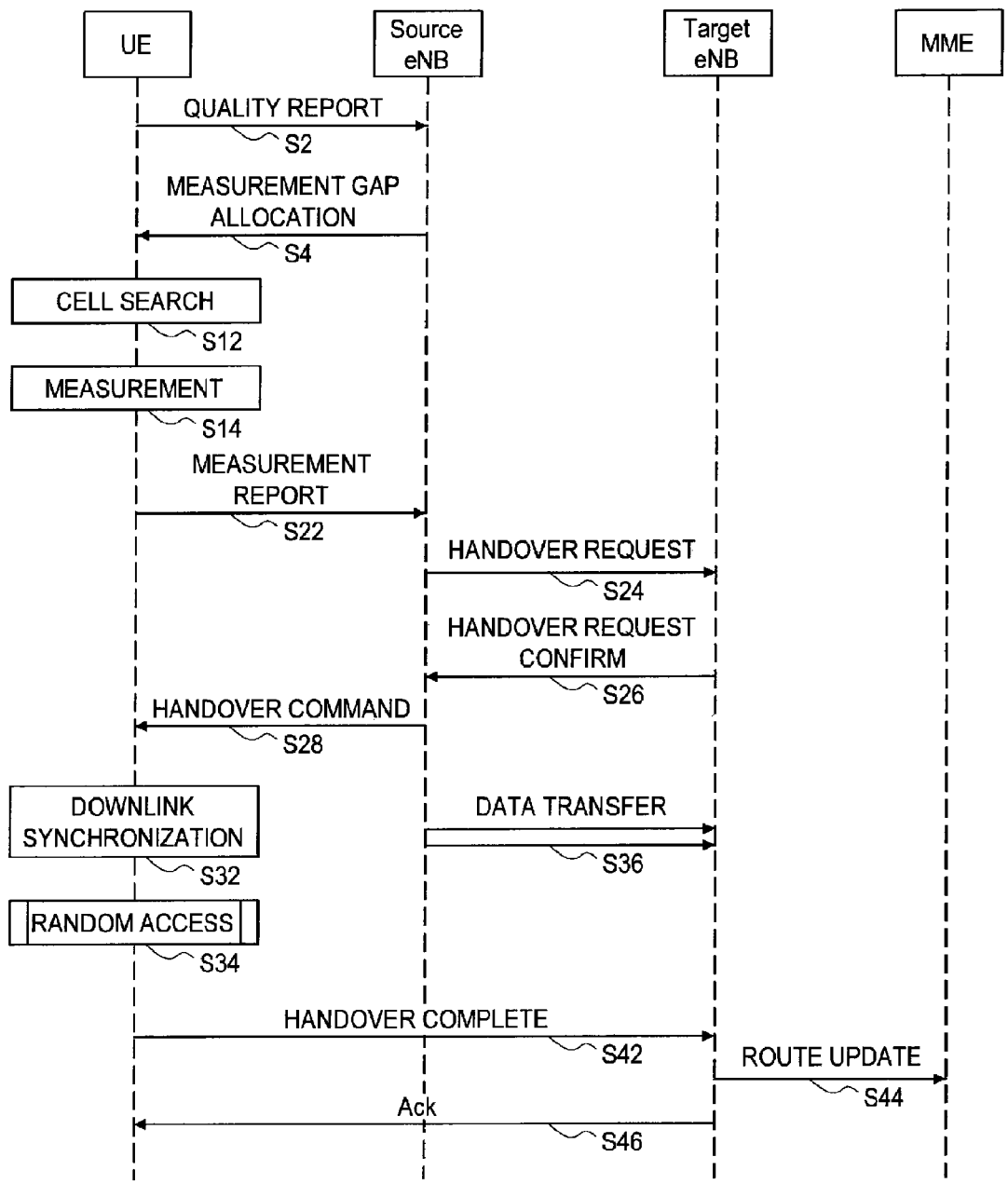
BACKGROUND ART

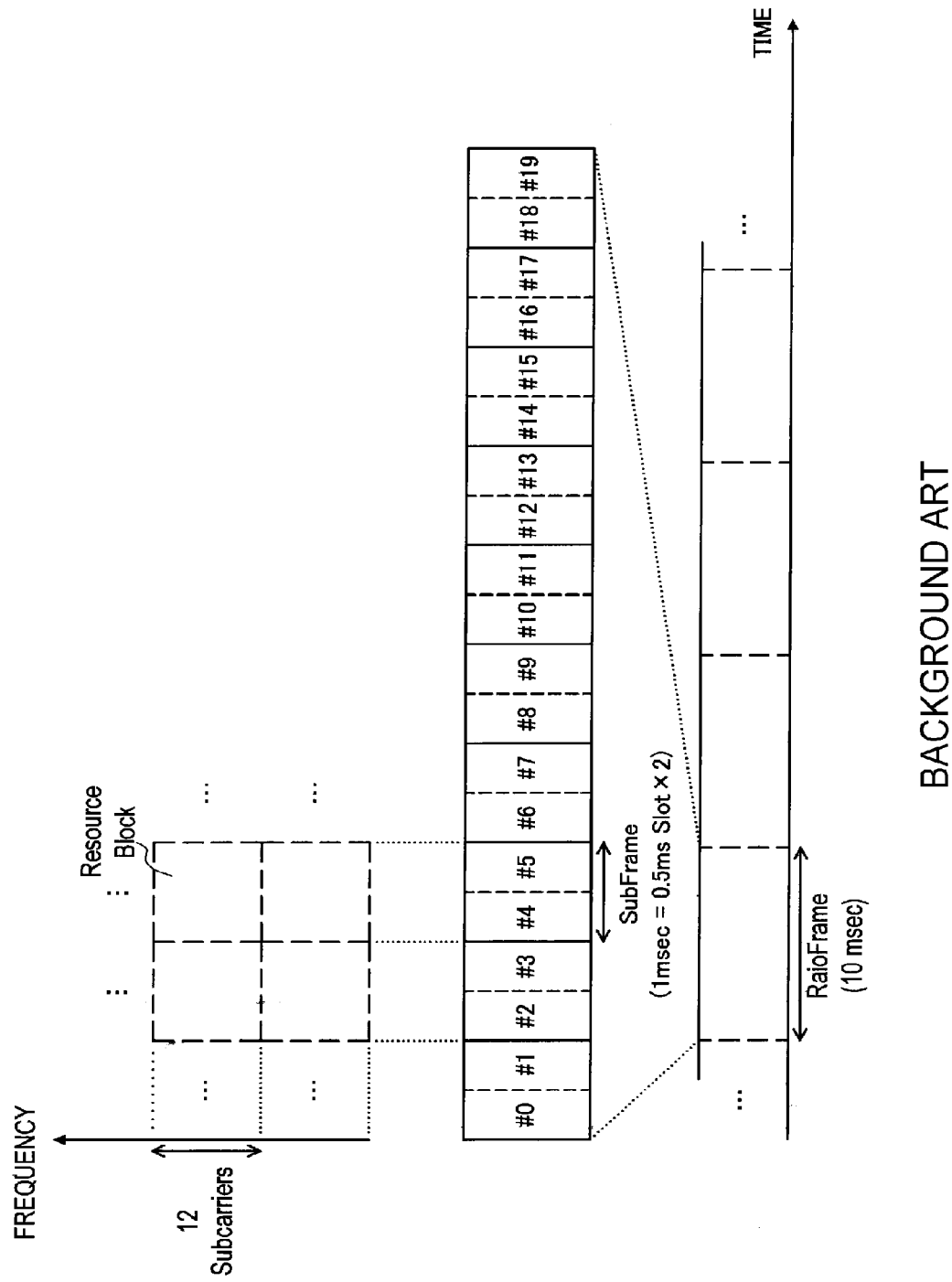

[Fig. 3A]
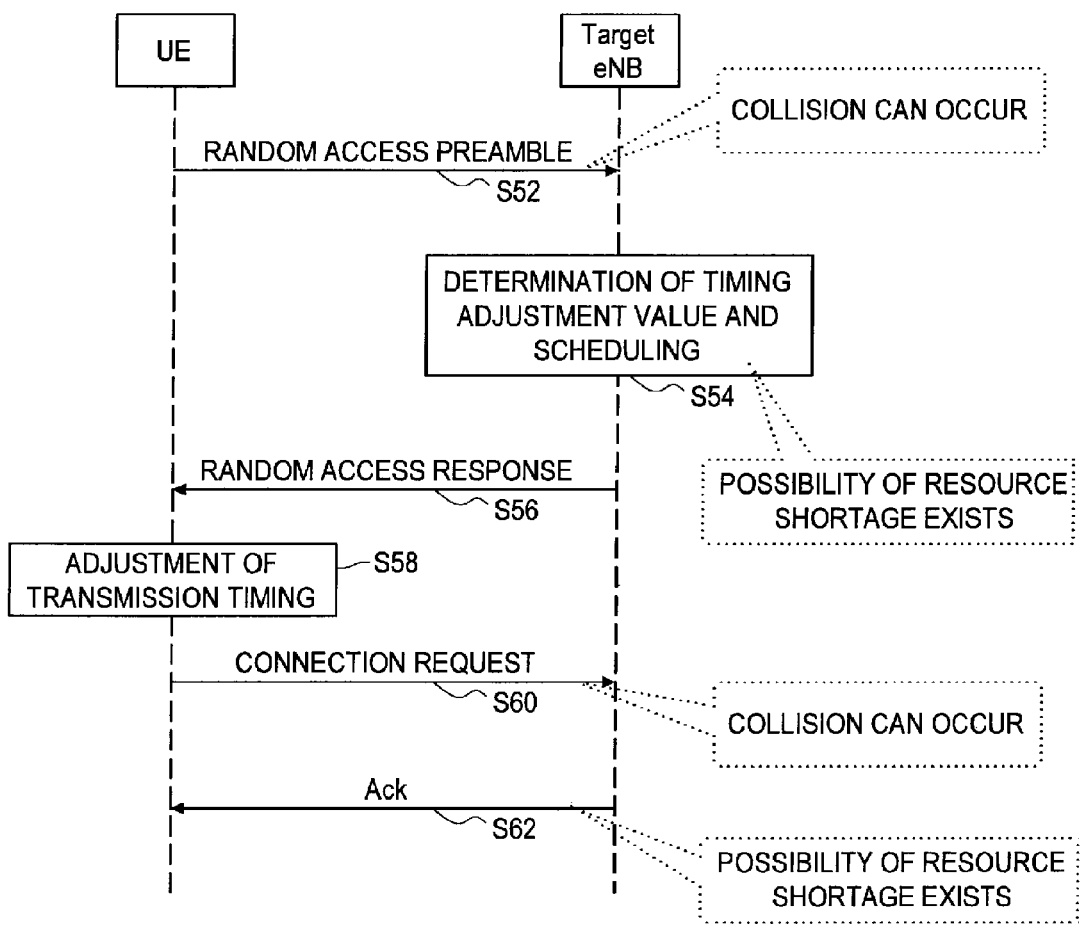
BACKGROUND ART

[Fig. 3B]
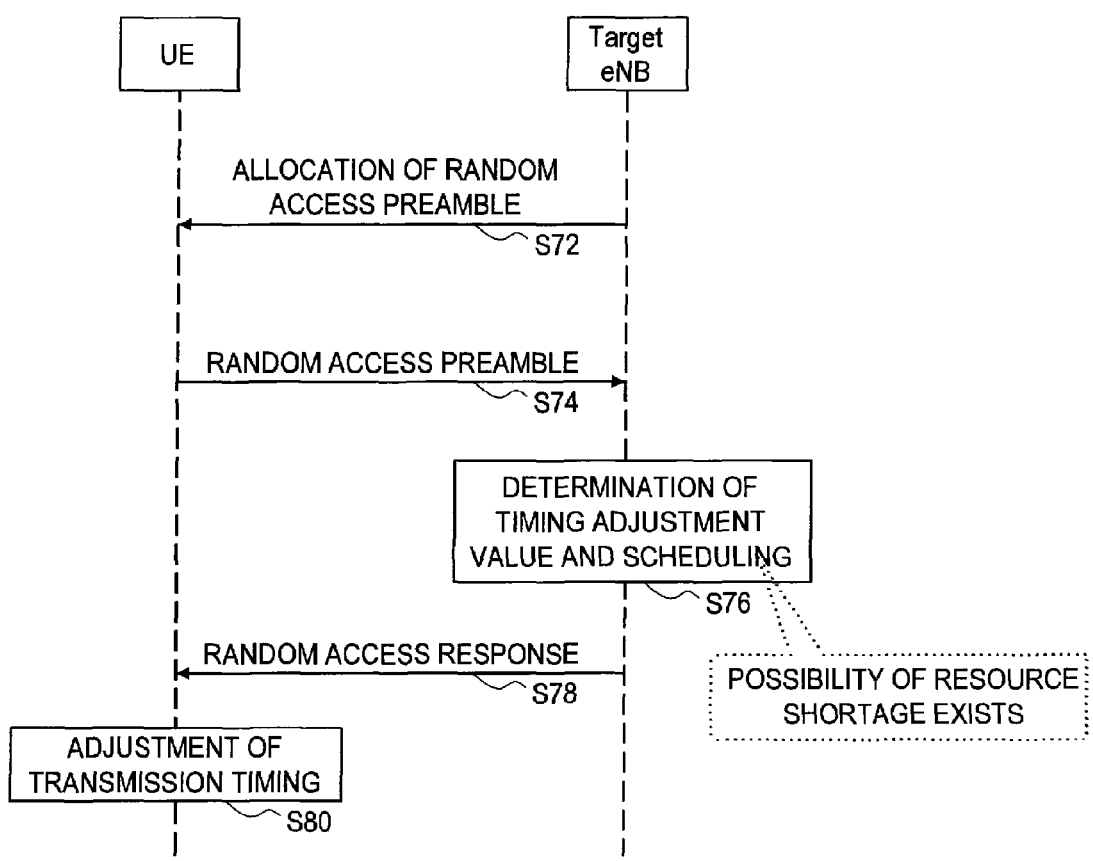
BACKGROUND ART

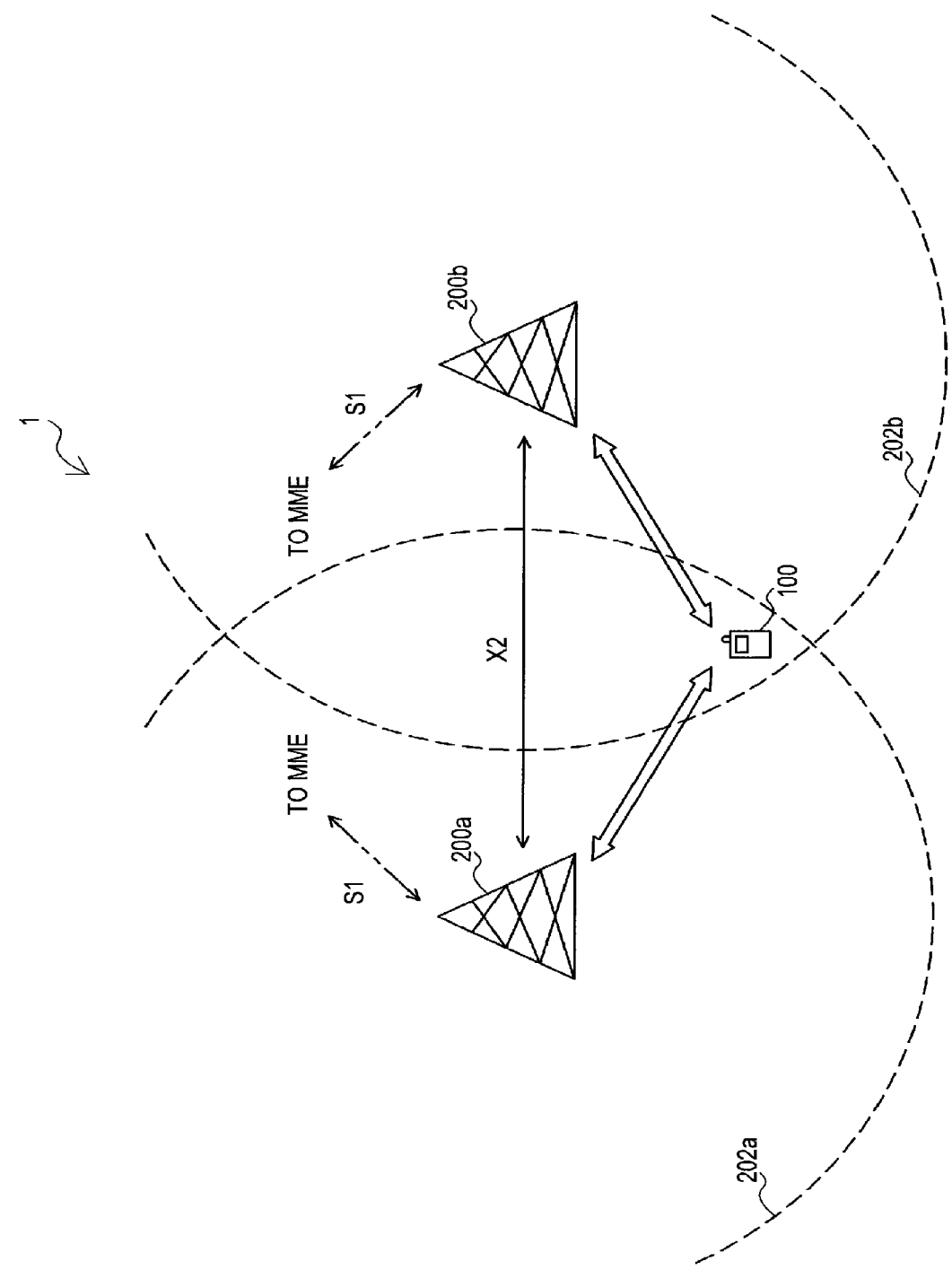
[Fig. 4]

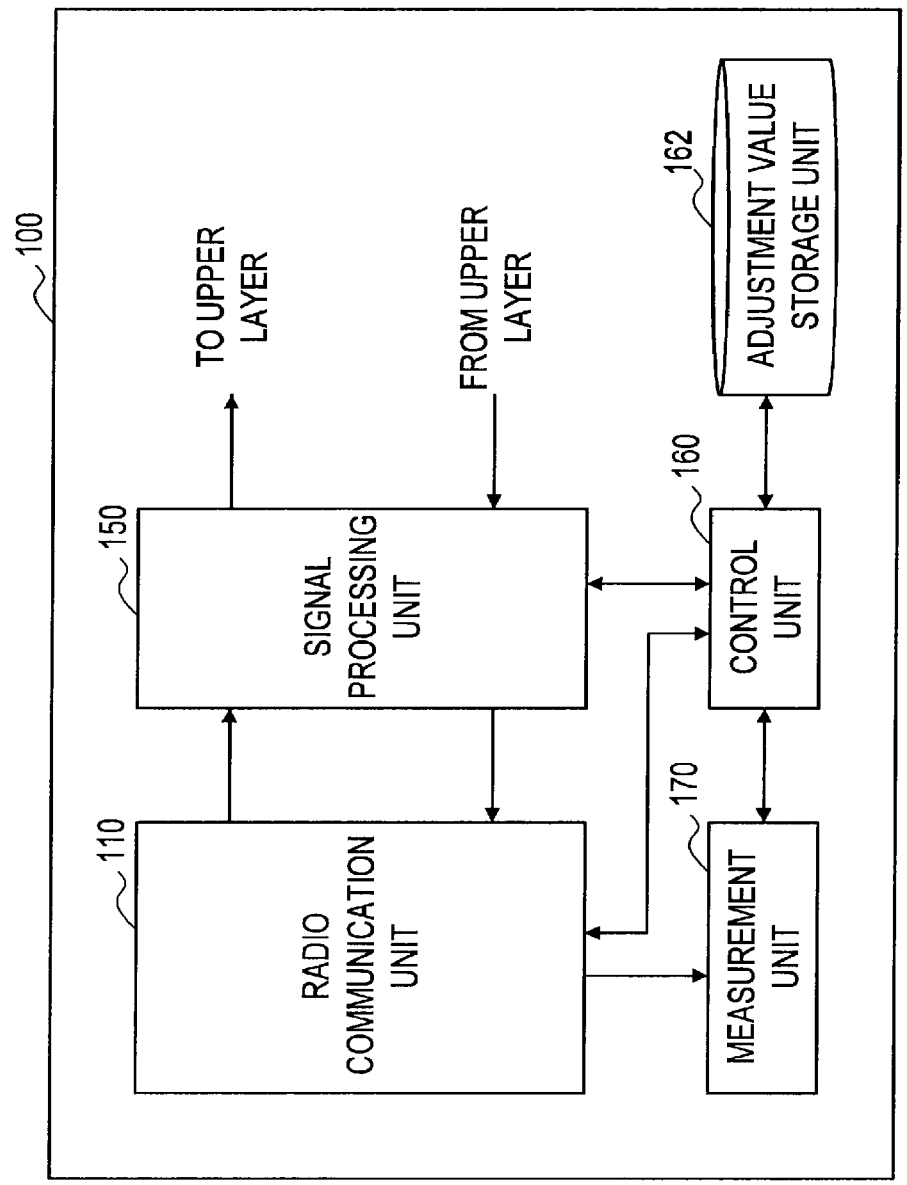
[Fig. 5]

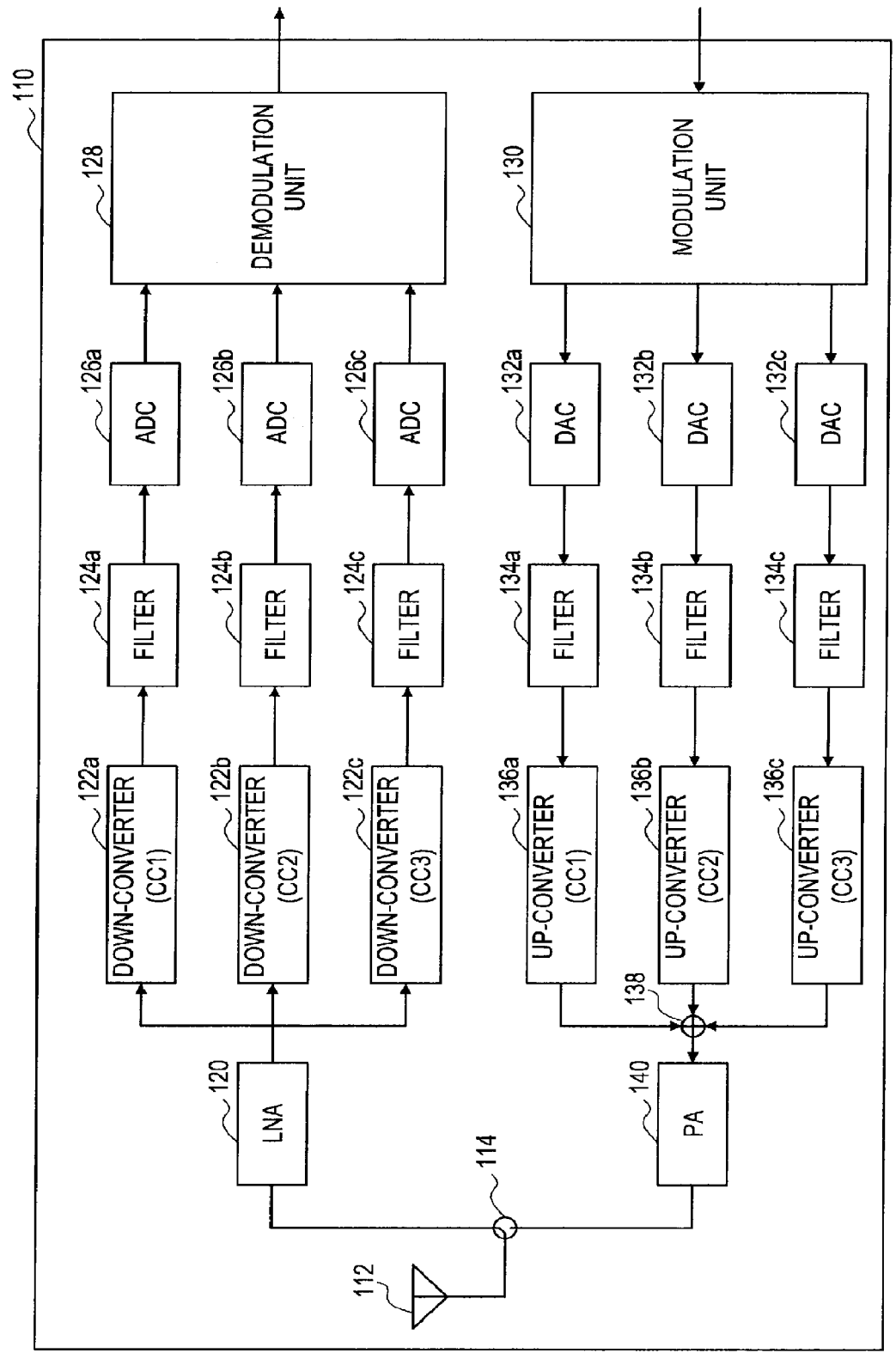
[Fig. 6]

[Fig. 7]
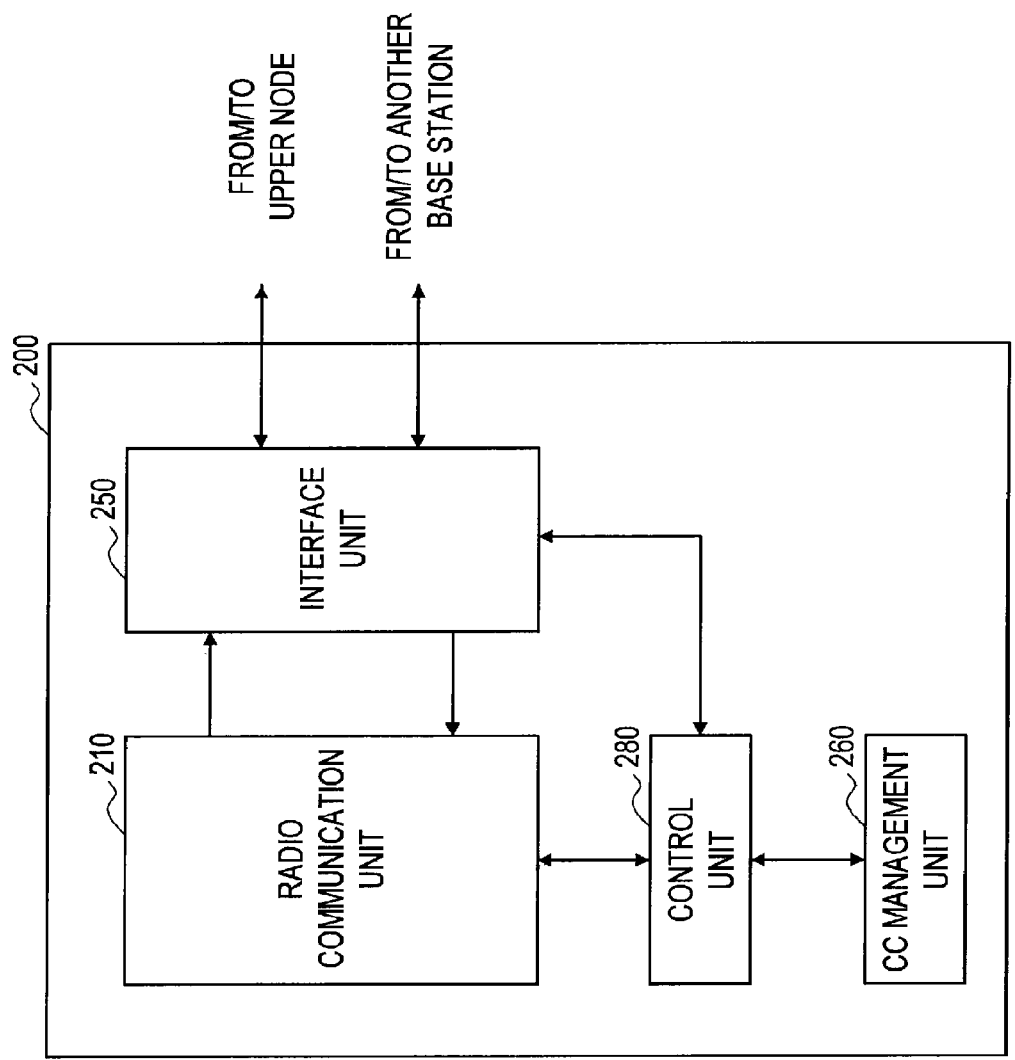

[Fig. 8]
<BEFORE HANDOVER>
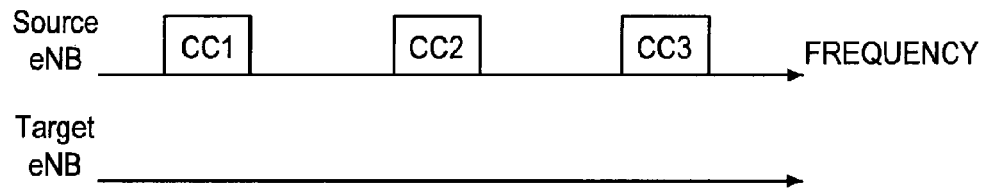
<AFTER CC1 HANDOVER>
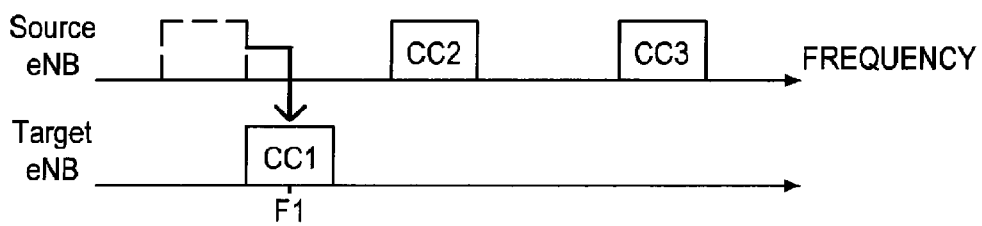
<AFTER CC2 HANDOVER>
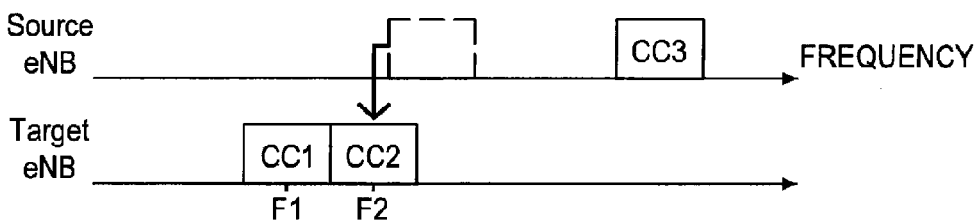
<AFTER CC3 HANDOVER>
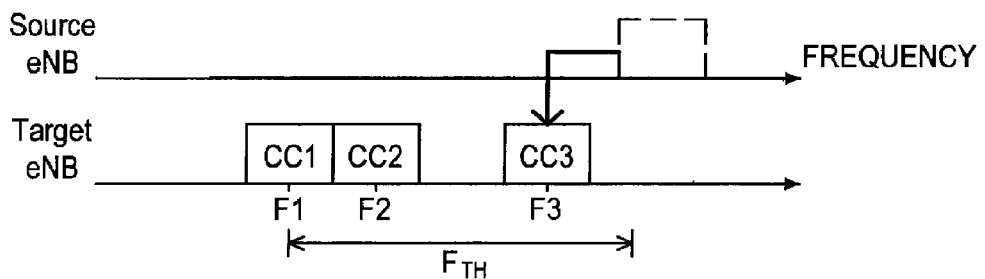

[Fig. 9A]
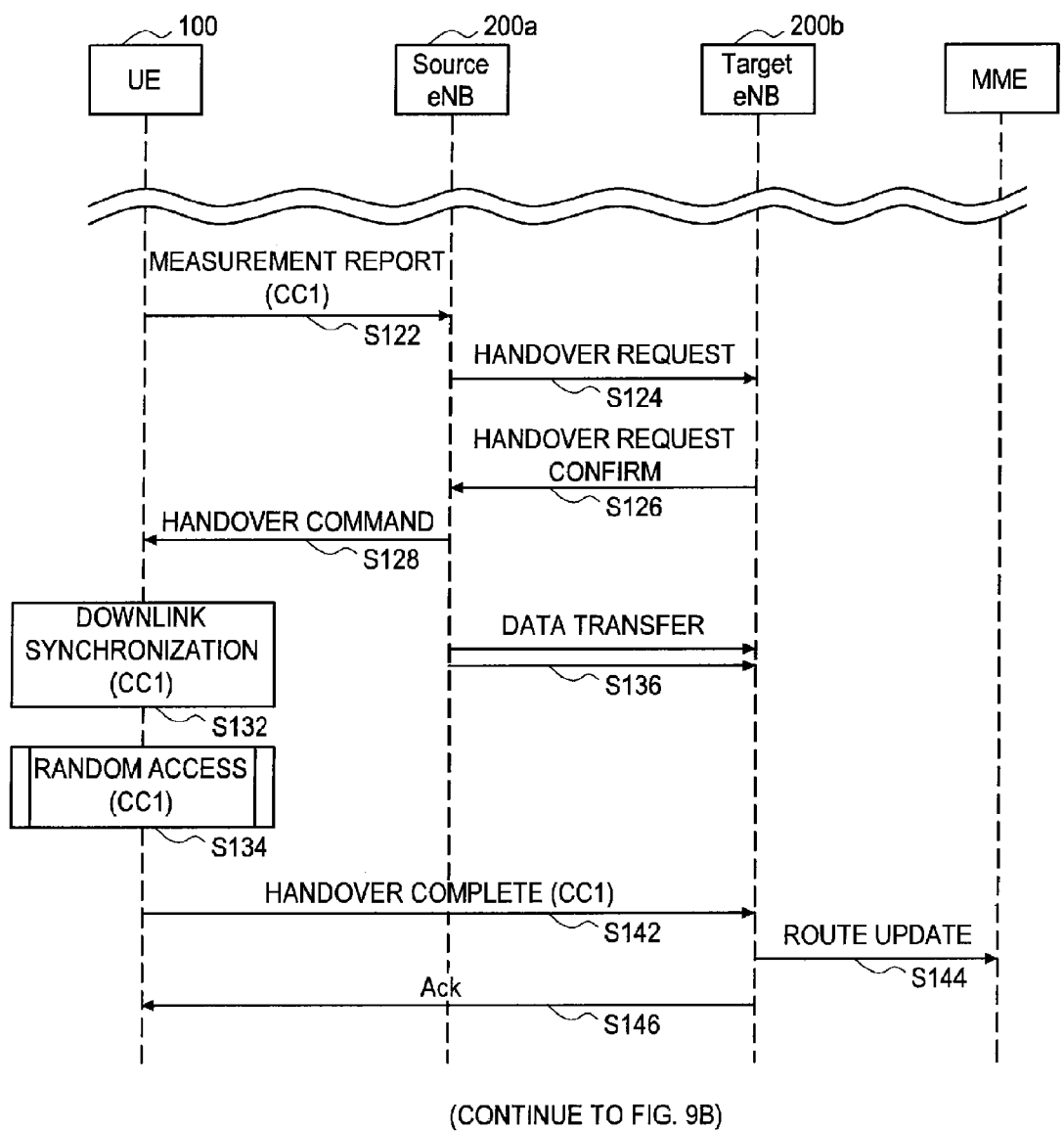
(CONTINUE TO FIG. 9B)

[Fig. 9B]
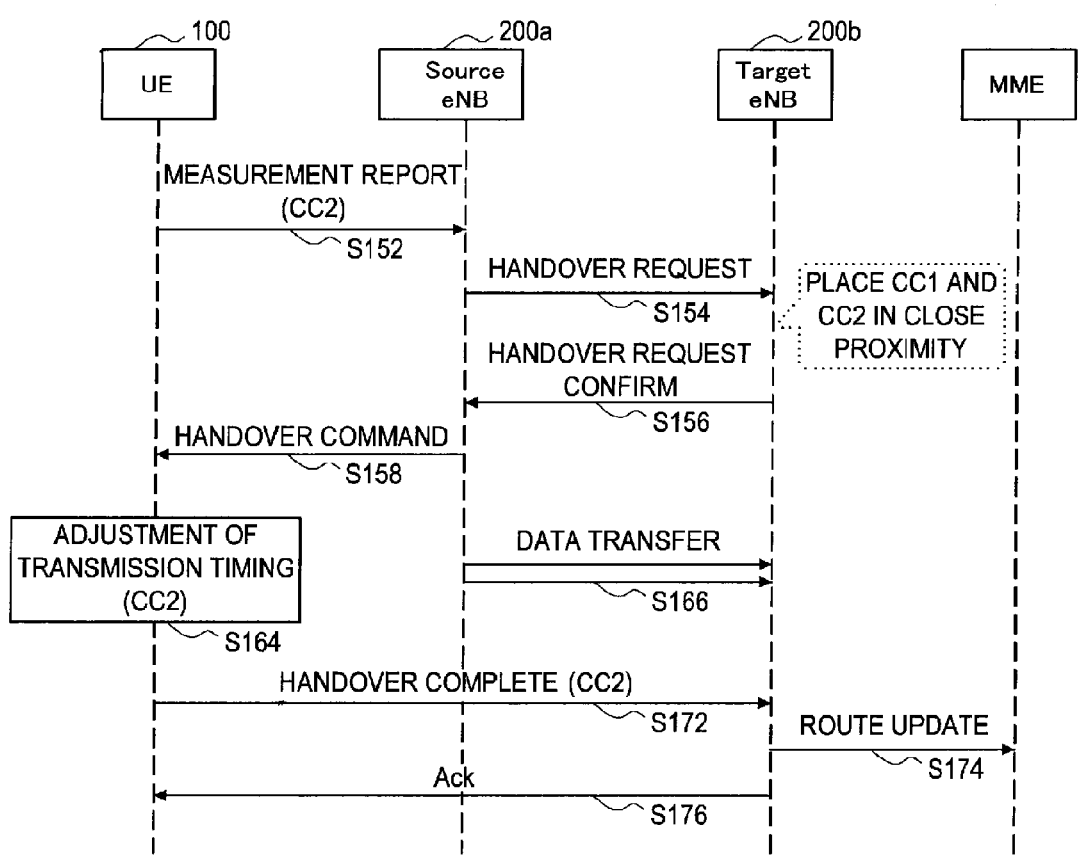

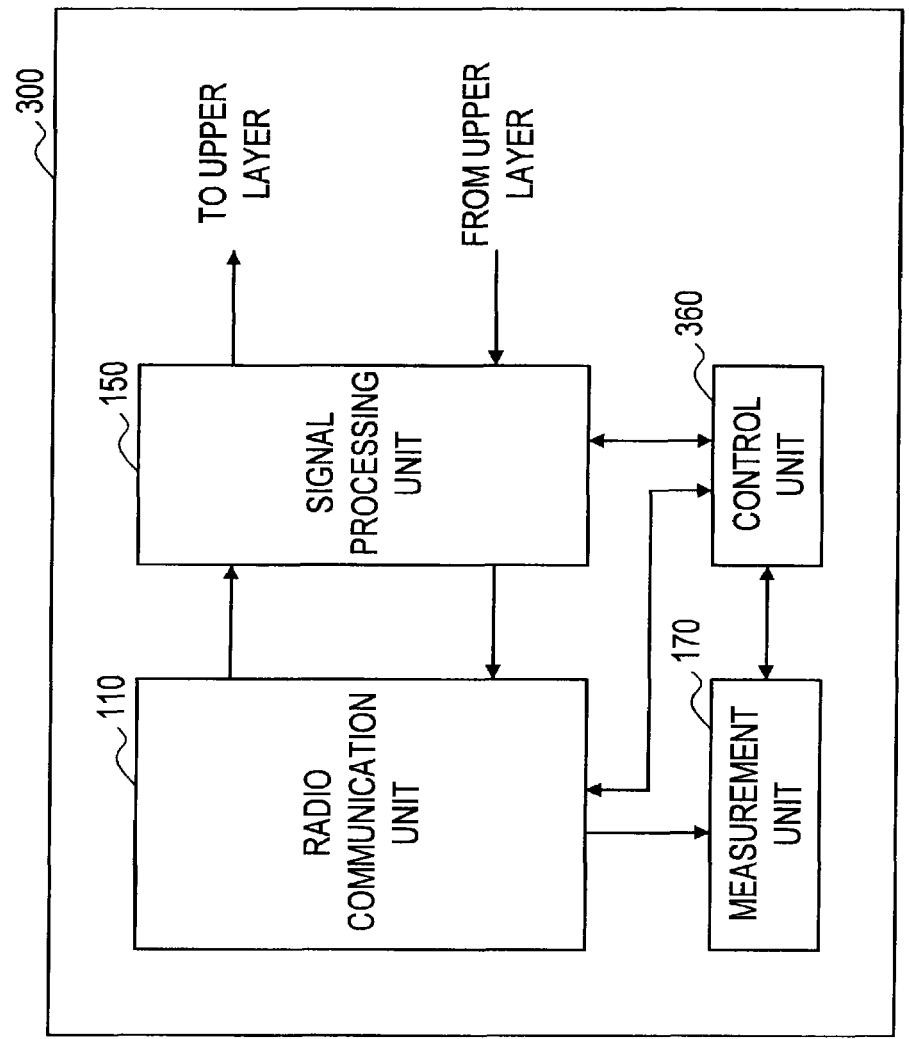
[Fig. 10]

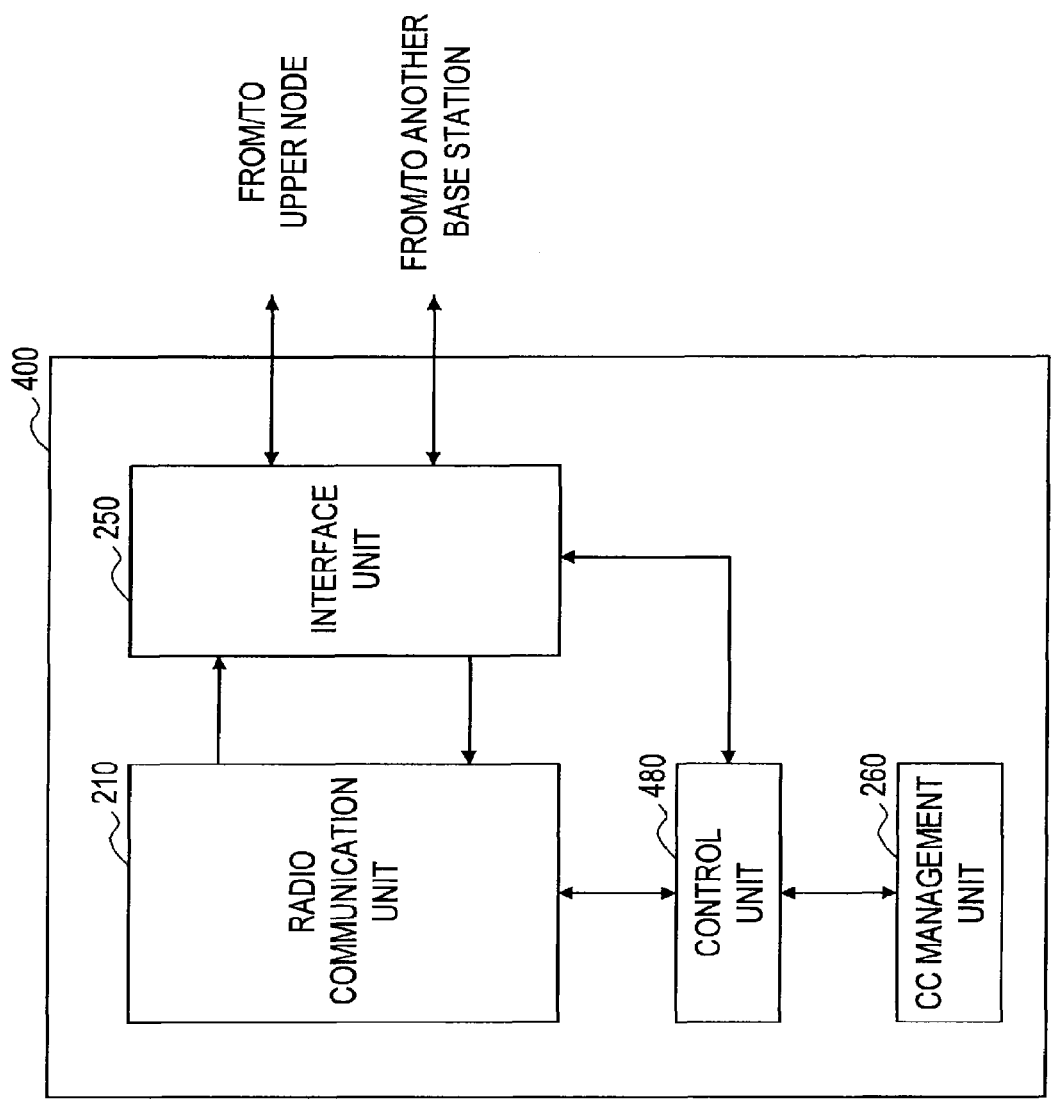

[Fig. 12A]
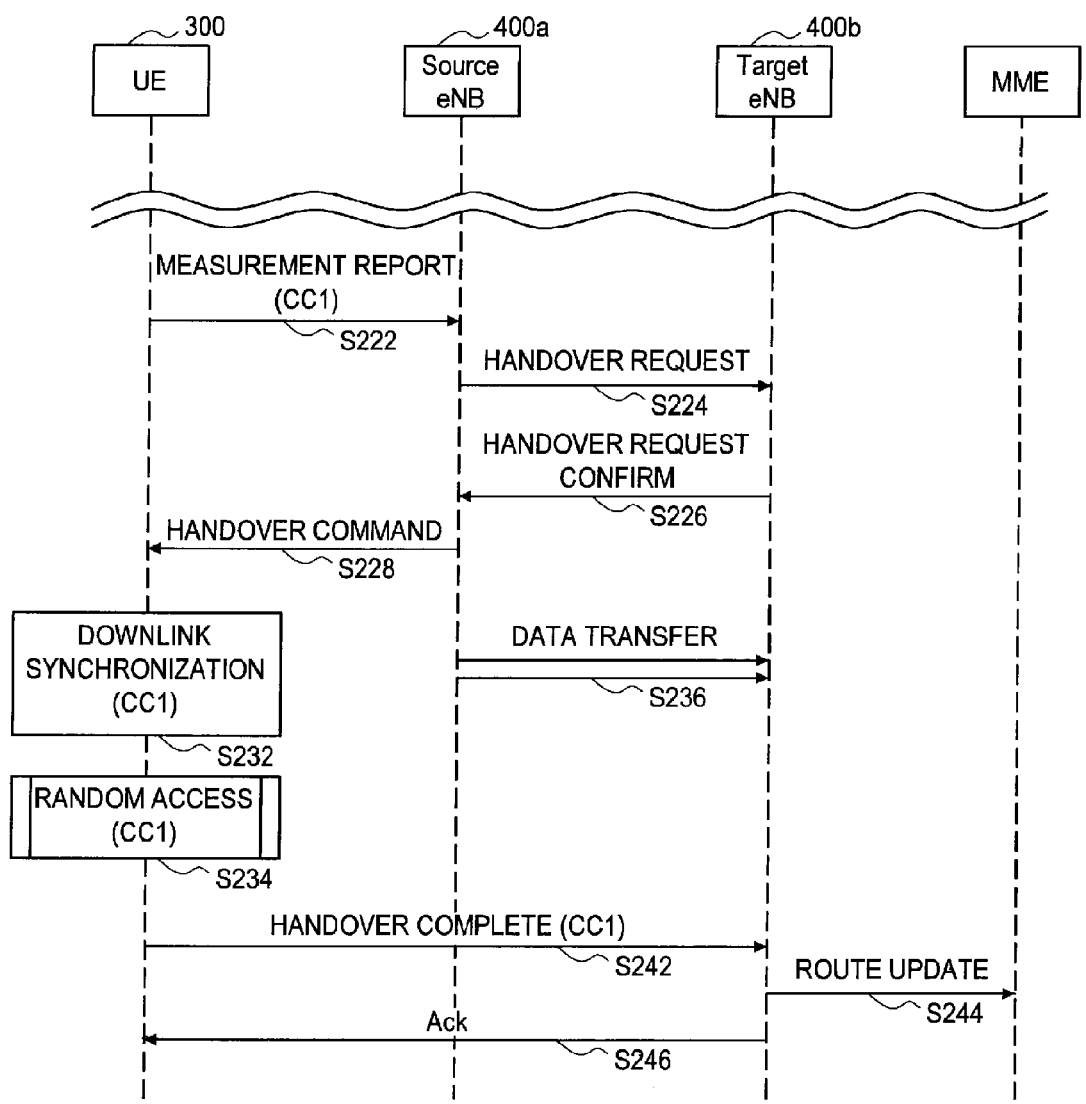
(CONTINUE TO FIG. 12B)

[Fig. 12B]
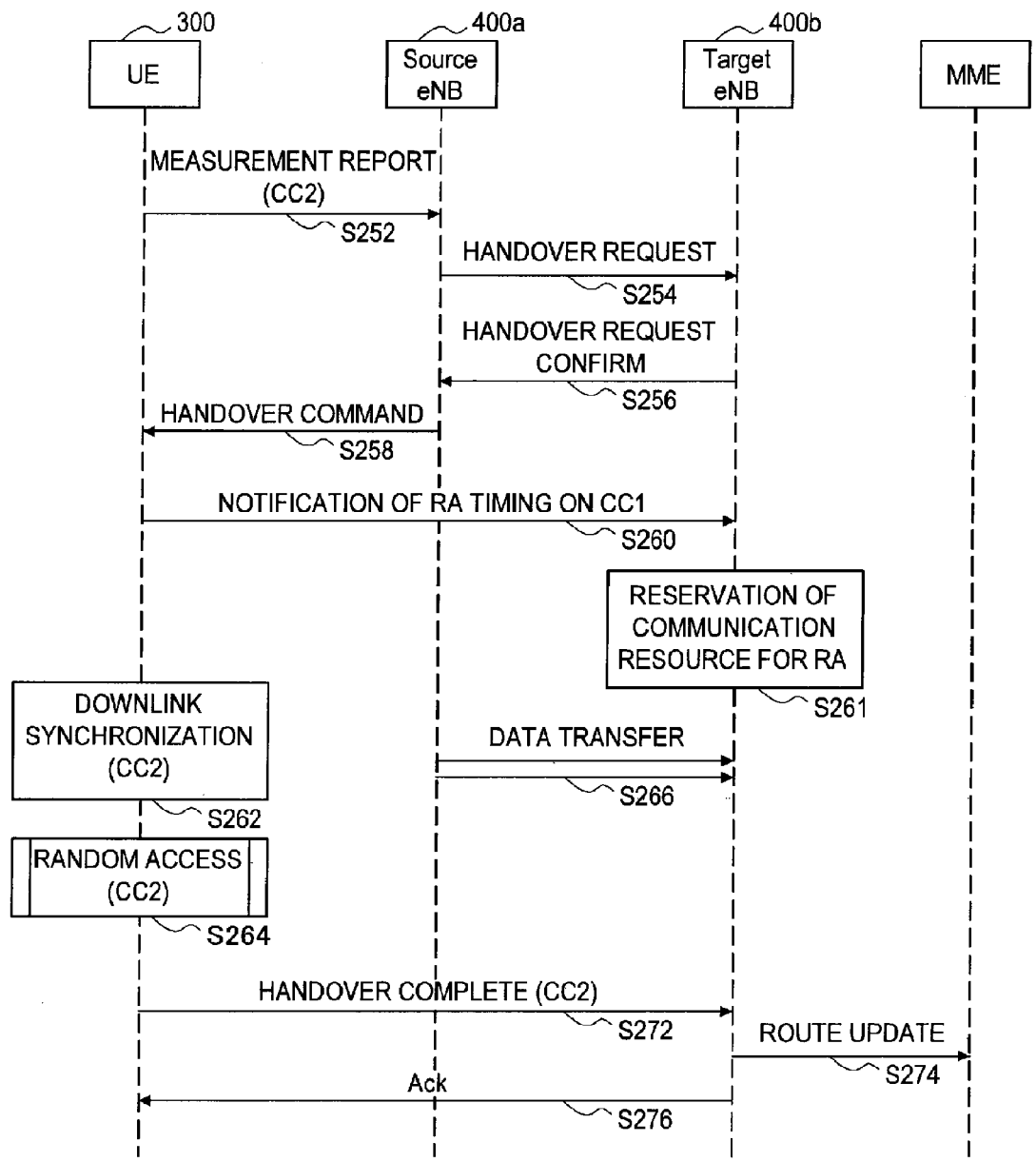

METHOD FOR PERFORMING HANDOVER, USER EQUIPMENT, AND RADIO COMMUNICATION SYSTEM

CROSS-REFERENCE TO RELATED APPLICATIONS

The present application is a continuation of and claims the benefit of priority under 35 U.S.C. §120 from U.S. application Ser. No. 15/136,507, filed Apr. 22, 2016, which is a continuation of U.S. application Ser. No. 13/514,163, now U.S. Pat. No. 9,374,838, filed Jun. 6, 2012, the entire contents of each of which is incorporated herein by reference. U.S. application Ser. No. 13/514,163 is a national stage of International Application No. PCT/JP2010/007037, filed Dec. 2, 2010, which is based on and claims the benefit of priority under 35 U.S.C. §119 from prior Japanese Patent Application No. 2009-285374, filed Dec. 16, 2009.

TECHNICAL FIELD

The present invention relates to a method for performing a handover, a user equipment, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

A handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below)

CITATION LIST

Patent Literature

[PTL 1]
Japanese Unexamined Patent Application Publication No. 2009-232293

SUMMARY OF INVENTION

Technical Problem

However, no case has been reported where active consideration is given to how to carry out a handover procedure in a radio communication involving the carrier aggregation.

For example, an initial access from a user equipment to a target base station during a handover procedure is performed as a random access over a random access channel which is preset at a prescribed position of communication resources. However, a random access inherently has a possibility of a delay due to signal collision, retry or the like. Further, adjustment of transmission timing based on timing of a random access is the overhead of a communication. Thus, in a radio communication involving the carrier aggregation, simply repeating random accesses the same number of times as the number of component carriers raises the possibility of degradation of service quality such as an accumulation of delays due to a failure of a random access or an increase in overhead.

In light of the foregoing, it is desirable to provide a novel and improved method for performing a handover, user equipment, and radio communication system that can minimize the degradation of service quality due to a random access during a handover procedure in a radio communication involving the carrier aggregation.

Solution to Problem

One exemplary embodiment includes a mobile station in a wireless communication network. The mobile station including a radio communication unit configured to transmit an access request message to a base station via a first communication resource, and receive a timing adjustment in response to the access request message from the base station; an adjustment value storage unit configured to store the timing adjustment; and a control unit configured to adjust access timing corresponding to a second communication resource based on the timing adjustment value stored in the adjustment value storage unit, wherein the radio communication unit is configured to communicate with the base station via the first communication resource and the second communication resource.

The first communication resource may be a first component carrier and the second communication resource may be a second component carrier. The second component carrier may be in close proximity to the first component carrier. The second component carrier may be adjacent to the first component carrier. The second component carrier may be within a predetermined threshold of the first component carrier.

The control unit may be configured to acquire synchronization with the base station via the first communication resource, and the radio communication unit may be configured to transmit the access request message based on the synchronization.

The timing adjustment may be based on a signal propagation characteristic between the mobile station and the base station, and the timing adjustment may depend on a frequency of the first communication resource.

Another exemplary embodiment includes a base station in a wireless communication network. The base station including a radio communication unit configured to receive an access request message from a mobile station via a first communication resource, and transmit a timing adjustment in response to the access request message to the mobile station; a control unit configured to assign a second communication resource for communications with the mobile station, the second communication resource being assigned based on a predetermined relationship with the first communication resource, wherein the radio communication unit is configured to communicate with the mobile station via the first communication resource and the second communication resource.

The first communication resource may be a first component carrier and the second communication resource may be a second component carrier. The control unit may be configured to assign a component carrier in close proximity to the first component carrier as the second component carrier, assign a component carrier adjacent to the first component carrier as the second component carrier, and/or assign a component carrier which is within a predetermined threshold of the first component carrier as the second component carrier. The control unit may also be configured to assign a component carrier, which is one of a plurality of available component carriers closest in proximity to the first component carrier, as the second component carrier.

Another exemplary embodiment is directed to a wireless communication network that includes a mobile station configured to transmit an access request message to a base station via a first communication resource; the base station configured to receive the access request message and transmit a timing adjustment in response to the access request message to the mobile station; an adjustment value storage unit, at the mobile station, configured to store the timing adjustment; a first control unit, at the base station, configured to assign a second communication resource for communications with the mobile station, the second communication resource being assigned based on a predetermined relationship with the first communication resource; a second control unit, at the mobile station, configured to adjust access timing corresponding to the second communication resource based on the timing adjustment value stored in the adjustment value storage unit, wherein the mobile station and the base station are configured to communicate via the first communication resource and the second communication resource.

Another exemplary embodiment is directed to a computer-readable medium including computer program instruction, which when executed by a mobile station in a wireless communication network, cause the mobile station to perform a method comprising: transmitting an access request message to a base station via a first communication resource; receiving a timing adjustment in response to the access request message from the target base station; storing the timing adjustment; adjusting an access timing corresponding to a second communication resource based on the stored timing adjustment value; and communicating with the base station via the first communication resource and the second communication resource.

Another exemplary embodiment is directed to a computer-readable medium including computer program instruction, which when executed by a base station in a wireless communication network, cause the base station to perform a method comprising: receiving an access request message from a mobile station via a first communication resource; transmitting a timing adjustment in response to the access request message to the mobile station; assigning a second communication resource for communications with the mobile station, the second communication resource being assigned based on a predetermined relationship with the first communication resource; and communicating with the mobile station via the first communication resource and the second communication resource.

Another exemplary embodiment is directed to a handoff method performed by a mobile communication network, the handoff method comprising: transmitting, from a mobile station to a base station, an access request message via a first communication resource; receiving, at the base station, the access request message; transmitting, from the base station to the mobile station, a timing adjustment in response to the access request message; storing, at an adjustment value storage unit at the mobile station, the timing adjustment; assigning, by the base station, a second communication resource for communications with the mobile station, the second communication resource being assigned based on a predetermined relationship with the first communication resource; adjusting, by the mobile station, access timing corresponding to the second communication resource based on the timing adjustment value stored in the adjustment value storage unit; and performing communication between the base station and the mobile station via the first communication resource and the second communication resource.

Advantageous Effects of Invention

As described above, the method for performing a handover, the user equipment, and the radio communication system according to the embodiments of the present invention can minimize the degradation of service quality due to a random access during a handover procedure in a radio communication involving the carrier aggregation.

BRIEF DESCRIPTION OF DRAWINGS

FIG. 1 is a sequence chart to describe a flow of a typical handover procedure.

FIG. 2 is an explanatory view to describe an example of a structure of a communication resource.

FIG. 3A is a sequence chart to describe a procedure of a contention-based random access.

FIG. 3B is a sequence chart to describe a procedure of a contention-free random access.

FIG. 4 is a schematic view showing an outline of a radio communication system according to an embodiment.

FIG. 5 is a block diagram showing an example of a configuration of a user equipment according to a first embodiment.

FIG. 6 is a block diagram showing an example of a detailed configuration of a radio communication unit according to the first embodiment.

FIG. 7 is a block diagram showing an example of a configuration of a base station according to the first embodiment.

FIG. 8 is an explanatory view to describe an allocation of component carriers by a target base station according to the first embodiment.

FIG. 9A is the first half of a sequence chart showing an example of a flow of a handover procedure according to the first embodiment.

FIG. 9B is the second half of a sequence chart showing an example of a flow of a handover procedure according to the first embodiment.

FIG. 10 is a block diagram showing an example of a configuration of a user equipment according to a second embodiment.

FIG. 11 is a block diagram showing an example of a configuration of a base station according to the second embodiment.

FIG. 12A is the first half of a sequence chart showing an example of a flow of a handover procedure according to the second embodiment.

FIG. 12B is the second half of a sequence chart showing an example of a flow of a handover procedure according to the second embodiment.

DESCRIPTION OF EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.
1. Description of Related Art
   1-1. Handover Procedure
   1-2. Structure of Communication Resource
   1-3. Description of Issue Related to Random Access
2. Outline of Radio Communication System
3. Description of First Embodiment
   3-1. Exemplary Configuration of User Equipment
   3-2. Exemplary Configuration of Base Station
   3-3. Flow of Process
   3-4. Summary of First Embodiment
4. Description of Second Embodiment
   4-1. Exemplary Configuration of User Equipment
   4-2. Exemplary Configuration of Base Station
   4-3. Flow of Process
   4-4. Summary of Second Embodiment

1. Description of Related Art (1-1. Handover Procedure)

A technique related to the present invention is described hereinafter with reference to FIGS. 1 to 3B. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MIME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4).

Then, the user equipment searches for a downlink channel from a peripheral base station (i.e. performs cell search) during the periods of the allocated measurement gaps (step S12) Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request message to the target base station (step S24).

Receiving the handover request message, the target base station determines whether it is possible to accept the user equipment according to the availability of a communication service offered by itself or the like. When it is possible to accept the user equipment, the target base station transmits a handover request confirm message to the source base station (step S26).

Receiving the handover request confirm message, the source base station transmits a handover command to the user equipment (step S28). Then, the user equipment acquires synchronization with the downlink channel of the target base station (step S32). After that, the user equipment makes a random access to the target base station by using a random access channel in a given time slot (step S34). During this period, the source base station forwards data addressed to the user equipment to the target base station (step S36). Then, after success in the random access, the user equipment transmits a handover complete message to the target base station (step S42).

Receiving the handover complete message, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

(1-2. Structure of Communication Resource)

FIG. 2 shows a structure of a communication resource in LTE as an example of a structure of a communication resource to which the present invention is applicable. Referring to FIG. 2, the communication resource in LTE is segmented in the time direction into radio frames each having a length of 10 msec. One radio frame includes ten sub-frames, and one sub-frame is made up of two 0.5 msec slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec with 12 sub-carriers in the time-frequency domain. Throughput of data communication increases as a larger number of resource blocks are allocated for data communication on condition of the same bandwidth and time length. Further, in such a structure of a communication resource, a part of radio frame with a given frequency band is reserved as a random access channel. The random access channel can be used for an access to a base station by a user equipment that has changed from an idle mode to an active mode, for example, in addition to for an initial access to a target base station in a handover procedure as described above.

(1-3. Description of Issue Related to Random Access)

FIGS. 3A and 3B are sequence charts to further describe general random access procedures. FIG. 3A shows a procedure of a contention-based random access.

Referring to FIG. 3A, the user equipment first transmits a random access preamble to the target base station (step S52). The random access preamble is selected from 64 different sequences. Because the 64 sequences are orthogonal to one another, even when the target base station receives different sequences at the same timing with the same frequency, it can separate those sequences. However, when the same sequence is transmitted from different user equipments at the same timing with the same frequency, there is a possibility of collision of random access preambles, which causes a random access to fail.

Next, the target base station which has received the random access preamble determines a timing adjustment value for each user equipment according to the reception timing (step S54). For example, the random access preamble of a user equipment which is located farther from the target base station arrives at the target base station at the later timing than the random access preamble of a user equipment which is located closer to the target base station. In this case, the target base station allocates a timing adjustment value indicating that a signal should be transmitted earlier to the former (i.e. far) user equipment. Further, the target base station performs scheduling for a connection request of the user equipment. Note that, when a communication resource for a connection request cannot be allocated due to the lack of available communication resources, a random access fails.

Then, the target base station transmits a random access response to the user equipment (step S56). The random access response contains the timing adjustment value determined by the target base station and scheduling information for a connection request by the user equipment. Receiving the random access response, the user equipment adjusts the transmission timing of a signal to the target base station by using the timing adjustment value contained in the random access response (step S58).

Then, the user equipment transmits a connection request to the target base station by using the communication resource which is specified by the scheduling information contained in the random access response (step S60). The connection request contains identification information of the user equipment or the like. Note that, for example, there is a possibility that the same random access preamble is transmitted from two or more user equipments in the step S52, and the random access preamble is received normally by the target base station. In such a case, the two or more user equipments which have received a random access response transmitted from the target base station can simultaneously transmit connection requests in the step S60. In this case also, a collision occurs between the connection requests, and a random access can thereby fail.

The target base station which has received the connection request from the user equipment then transmits acknowledgement to the user equipment (step S62). Note that, when a communication resource for the acknowledgement cannot be allocated due to the lack of available communication resources, there is a possibility that the acknowledgement is not transmitted. When the user equipment receives the acknowledgement in the step S62, it recognizes that the random access has succeeded, and a series of random access procedure ends. On the other hand, when the user equipment does not receive the random access response or the acknowledgement, it determines that the random access has failed and retries the random access after the lapse of a random backoff period.

FIG. 3B shows a procedure of a contention-free random access. Referring to FIG. 3B, the target base station first allocates a random access preamble to the user equipment (step S72). The random access preamble for the contention-free random access is selected by the target base station from a predetermined number (e.g. reserved 10) of sequences among 64 orthogonal sequences, for example.

Next, the user equipment transmits the random access preamble to the target base station (step S74). In this case, because there is no case where the same random access preamble is used by different user equipments at the same timing with the same frequency, a collision of random access preambles does not occur.

Then, the target base station which has received the random access preamble determines a timing adjustment value for each user equipment according to the reception timing (step S76). Further, the target base station performs scheduling for a connection request of the user equipment. Note that, when a communication resource for a connection request cannot be allocated due to the lack of available communication resources, a random access fails.

Then, the target base station transmits a random access response to the user equipment (step S78). The random access response contains the timing adjustment value determined by the target base station and scheduling information for a connection request by the user equipment. Receiving the random access response, the user equipment adjusts the transmission timing of a signal to the target base station by using the timing adjustment value contained in the random access response (step S80). After that, the user equipment establishes a connection with the target base station in the same manner as the contention-based random access procedure.

As is understood from the above description, in the random access procedure, a random access can fail due to the collision of signals or the shortage of communication resources. Then, a random access is retried after the lapse of a random backoff period. During this period, a communication by the user equipment delays. Further, the time needed for calculation of a timing adjustment value and adjustment of transmission timing is the overhead of a communication. The use of the contention-free random access procedure reduces the possibility of signal collision. However, because the number of random access preambles which are reserved for the contention-free random access is limited, the contention-free random access procedure is not always available in a handover procedure. Therefore, for the purpose of preventing the degradation of service quality, it is effective to perform a random access during a handover procedure in a radio communication involving the carrier aggregation more efficiency as in two embodiments of the present invention which are described in detail below.

2. Outline of Radio Communication System

FIG. 4 is a schematic view showing an outline of a radio communication system 1 according to an embodiment of the present invention. Referring to FIG. 4, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be transmitted and received between the base station 200a and the base station 200b. Further, the base station 200a and the base station 200b can communicate with the MME, which is an upper node, through S1 interface, for example.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

3. Description of First Embodiment

A first embodiment of the present invention for making a more efficient random access during a handover procedure in a radio communication involving the carrier aggregation is described hereinafter with reference to FIGS. 5 to 9B.

(3-1. Exemplary Configuration of User Equipment)

FIG. 5 is a block diagram showing an example of a configuration of the user equipment 100 according to the embodiment. Referring to FIG. 5, the user equipment 100 includes a radio communication unit 110, a signal processing unit 150, a control unit 160, an adjustment value storage unit 162, and a measurement unit 170.

(Radio Communication Unit)

The radio communication unit 110 performs a radio communication with the base station 200 over a communication channel formed by aggregating a plurality of component carriers with use of the carrier aggregation technology.

FIG. 6 is a block diagram showing an example of a more detailed configuration of the radio communication unit 110. Referring to FIG. 6, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifiers the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 6, the number of component carriers handled by the radio communication unit 110 may be two, or four or more.

Further, instead of processing the signals of the respective component carriers in the analog region as in the example of FIG. 6, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal Processing Unit)

Referring back to FIG. 5, an example of a configuration of the user equipment 100 is further described below.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signal to the radio communication unit 110.

(Control Unit)

The control unit 160 controls the overall functions of the user equipment 100 by using a processing device such as a central processing unit (CPU) or a digital signal processor (DSP). For example, the control unit 160 controls the timing of data communication by the radio communication unit 110 according to scheduling information that is received from the base station 200 by the radio communication unit 110. At this time, the control unit 160 adjusts the timing of data transmission from the radio communication unit 110 by using a timing adjustment value which is notified from the base station 200 in a random access procedure. Further, the control unit 160 controls the measurement unit 170 to measure the channel quality by using a reference signal from the base station 200, which is a serving base station, and transmits the channel quality report to the base station 200 through the radio communication unit 110. Further, the control unit 160 controls the measurement unit 170 to execute measurement during the periods of measurement gaps which are allocated by the base station 200.

Further, in this embodiment, when two or more component carriers are allocated by the target base station during a handover procedure, the control unit 160 determines whether a distance in the frequency direction between the two or more component carriers is smaller than a specific threshold. When the distance in the frequency direction is smaller than a specific threshold, the control unit 160 skips a random access to the target base station for at least one of the two or more component carriers. Specifically, when first and second component carriers exist in close proximity in the frequency direction, the control unit 160 makes a random access for the first component carrier and skips a random access for the second component carrier. The specific threshold may be the maximum value of a difference between two frequencies (e.g. the center frequencies of the respective component carriers) whose transmission timing can be adjusted appropriately based on one timing adjustment value notified from the target base station in a random access procedure. Thus, even when a random access is skipped for any of the component carriers, the user equipment 100 can carry out a handover by appropriately adjusting the transmission timing for the component carrier. A transmission timing difference depends on a distance between each user equipment and a base station. Thus, a timing adjustment is typically used between user equipment and a base station for purposes of synchronization. When the user equipment handles a plurality of component carriers, it is also typical for the user equipment to adjust transmission timing for each component carrier because the timing difference depends on frequency. Generally, propagation characteristics include, but not limited to, characteristics of reflection, diffraction, scattering and propagation. These characteristics are known to depend on frequency of the component carrier. Therefore, if one frequency is close another frequency, the characteristic such as propagation delay is similar to each other between two different frequencies. These propagation characteristics affect the propagation delay amount of the signals. Therefore, in the case where the a distance in the frequency direction between the two component carriers is smaller than a specific threshold, propagation delay of the signals over the two component carriers is close to each other. Therefore, it becomes easier to adjust transmission timing of one component carrier based on the transmission timing of another component carrier.

Further, in the case where a new communication channel with a target base station is composed of three or more component carriers, when a distance in the frequency direction between certain component carriers among them is smaller than a specific threshold, the control unit 160 may skip a random access for at least one of the component carriers. For example, it is assumed that a distance in the frequency direction between the component carrier CC1 and the component carrier CC2 among the component carriers CC1 to CC3 is smaller than a specific threshold, and a distance between the component carrier CC1, CC2 and the component carrier CC3 is larger than the specific threshold. In this case, the control unit 160 may make a random access to the target base station for the component carriers CC1 and CC2 in one time and further make a random access to the target base station for the component carrier CC3.

In the case of skipping a random access for any of the component carriers, the control unit 160 first executes a random access to the target base station for another component carrier which exists in close proximity to the relevant component carrier in the frequency direction. Then, the control unit 160 stores the timing adjustment value which is notified from the target base station in the wake of the random access into the adjustment value storage unit 162. After that, the control unit 160 adjusts the transmission timing for the component carrier for which a random access is skipped by using the timing adjustment value stored in the adjustment value storage unit 162. Then, the control unit 160 makes an access to the target base station over the relevant component carrier at the adjusted transmission timing (the access in this case is not a random access).

(Adjustment Value Storage Unit)

The adjustment value storage unit 162 stores a timing adjustment value for one or more component carriers which is input from the control unit 160 by using a storage medium such as a hard disk or semiconductor memory. Then, in response to a command from the control unit 160, the adjustment value storage unit 162 outputs the stored timing adjustment value for use in adjustment of the transmission timing for another component carrier.

(Measurement Unit)

The measurement unit 170 measures the channel quality for each of the component carriers by using a reference signal from the base station 200 according to control from the control unit 160, for example. Further, the measurement unit 170 executes measurement for a handover with respect to each of the component carriers by using the measurement gaps which are allocated by the base station 200. A result of the measurement executed by the measurement unit 170 is converted to a predetermined format for a measurement report by the control unit 160 and transmitted to the base station 200 through the radio communication unit 110. After that, the base station 200 determines, based on the measurement report, whether a handover should be executed or not for the user equipment 100.

(3-2. Exemplary Configuration of Base Station)

FIG. 7 is a block diagram showing an example of a configuration of the base station 200 according to the embodiment. Referring to FIG. 7, the base station 200 includes a radio communication unit 210, an interface unit 250, a component carrier (CC) management unit 260, and a control unit 280.

(Radio Communication Unit)

A specific configuration of the radio communication unit 210 may be similar to the configuration of the radio communication unit 110 of the user equipment 100 which is described above with reference to FIG. 6, although the number of component carriers to be supported, the requirements of processing performance or the like are different. The radio communication unit 210 performs a radio communication with the user equipment over a communication channel which is formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 4, for example. Further, the interface unit 250 mediates a communication between the radio communication unit 210 or the control unit 280 and another base station through the X2 interface illustrated in FIG. 4, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when the existing user equipment changes its component carriers. Thus, the control unit 280 can recognize which component carrier the user equipment 100 is using by referring to the data held by the CC management unit 260.

(Control Unit)

The control unit 280 controls the overall functions of the base station 200 by using a processing device such as a CPU or a DSP. For example, the control unit 280 executes an allocation of communication resources for data communication, i.e. scheduling, for the user equipment 100 and other user equipments. Then, the control unit 280 delivers scheduling information over a broadcast channel in a given sub-frame. Further, when the base station 200 is a target base station of a handover of a radio communication involving the carrier aggregation, the control unit 280 allocates two or more component carriers to a new communication channel. At this time, when two or more component carriers which are adjacent in the frequency direction are allocable, the control unit 280 allocates the two or more component carriers to the new communication channel. Further, when two or more component carriers whose distance in the frequency direction is smaller than the above-described specific threshold are allocable, the control unit 280 allocates the two or more component carriers to the new communication channel.

FIG. 8 is an explanatory view to describe an allocation of component carriers by a target base station according to the embodiment. FIG. 8 shows a step-by-step handover including four stages in the case where a communication channel is composed of three component carriers CC1 to CC3. The first stage is before a handover. The second stage is after a handover of the component carrier CC1. The third stage is after a handover of the component carriers CC1 and CC2. The fourth stage is after a handover of all the component carriers.

First, in the first stage, the component carriers CC1 to CC3 are connected with a source base station. The positions of the component carriers CC1 to CC3 in the frequency direction may be any positions.

Next, when a handover is completed for the component carrier CC1, the handover procedure proceeds to the second stage. The frequency band to which the component carrier CC1 is allocated in the target base station may be the same frequency band as the frequency band in the source base station or a different frequency band from the frequency band in the source base station.

Then, the control unit 280 of the target base station which has received a handover request for the component carrier CC2 determines whether the component carriers CC1 and CC2 can be allocated so that they are adjacent in the frequency direction. It is assumed in the example of FIG. 8 that the component carriers CC1 and CC2 can be allocated so that they are adjacent in the frequency direction. Thus, the control unit 28 allocates the component carriers CC1 and CC2 so that they are adjacent in the frequency direction (third stage).

Further, the control unit 280 of the target base station which has received a handover request for the component carrier CC3 determines whether the component carrier CC1 or CC2 and the component carrier CC3 can be allocated so that they are adjacent in the frequency direction. It is assumed in the example of FIG. 8 that those component carriers are not allocable to be adjacent in the frequency direction. Then, the control unit 28 determines whether the component carrier CC3 can be allocated to a new communication channel so that a distance from the component carrier CC1 or CC2 in the frequency direction is smaller than a threshold $F_{TH}$. The threshold $F_{TH}$ indicates the above-described specified threshold which can correspond to the maximum value of a difference between two frequencies whose transmission timing can be adjusted appropriately based on one timing adjustment value. It is assumed in the example of FIG. 8 that the component carrier CC3 can be allocated so that the distances from the component carriers CC1 and CC2 are smaller than the threshold $F_{TH}$. Thus, the control unit 280 allocates the component carrier CC3 to the position where the distances from the component carriers CC1 and CC2 are smaller than the threshold $F_{TH}$ (fourth stage).

It should be noted that, FIG. 8 shows the case where, after a handover for one component carrier is completed, another component carrier is allocated to the new communication channel. However, the allocation of another component carrier to a new communication channel may be performed before completion of a handover for one component carrier. Further, in the example of FIG. 8, it is described that, for a certain component carrier, the frequency band of the component carrier is changed at the time of an access to the target base station by the user equipment 100. However, for a certain component carrier, a base station to which the component carrier is connected may be changed from the source base station to the target base station after the frequency band has changed in the source base station according to the above-described conditions related to the position in the frequency direction.

In addition to such an allocation of component carriers, the control unit 280 controls the base station 200 to operate in the same manner as the source base station or the target base station in the handover procedure which is descried with reference to FIG. 1.

(3-3. Flow of Process)

A flow of a handover procedure according to the embodiment is described hereinafter with reference to FIGS. 9A and 9B. Note that, in the following scenario, it is assumed that a handover procedure is performed among the user equipment 100, the base station 200*a* serving as a source base station, and the base station 200*b* serving as a target base station. Further, for simplification of description, it is assumed in this scenario that the user equipment 100 performs a radio communication by using two component carriers. Furthermore, for the procedure up to measurement in the user equipment (steps S2 to S14) in the typical handover procedure illustrated in FIG. 1, explanation is omitted because there is no significant difference.

Referring to FIG. 9A, the user equipment 100 first transmits a measurement report for the component carrier CC1, for example, to the base station 200*a* (step S122). Receiving the measurement report, the base station 200*a* determines the necessity of a handover based on the measurement report. For example, when a channel quality between the user equipment 100 and the base station 200*b* is better than a channel quality between the user equipment 100 and the base station 200*a* by a predetermined threshold or greater, it can be determined that a handover is necessary. In this case, the base station 200*a* transmits a handover request message for the component carrier CC1 to the base station 200*b* (step S124). Receiving the handover request message, the base station 200*b* allocates the component carrier CC1 to any frequency band for a new communication channel with the user equipment 100 according to the availability of a communication service. Then, the base station 200*b* transmits a handover request confirm message to the base station 200*a* (step S126). Receiving the handover request confirm message, the base station 200*a* transmits a handover command for the component carrier CC1 to the user equipment 100 (step S128).

Receiving the handover command, the user equipment 100 first acquires synchronization with the downlink channel of the component carrier CC1 of the base station 200*b* (step S132). Then, the user equipment 100 makes a random access to the base station 200*b* by using a random access channel of the component carrier CC1 (step S134). During this period, the control unit 160 of the user equipment 100 stores the timing adjustment value for the component carrier CC1 which is notified from the base station 200*b* into the adjustment value storage unit 162. During the downlink synchronization and the random access, the base station 200*a* forwards data addressed to the user equipment 100 to the base station 200*b* (step S136).

Then, after success in the random access for the component carrier CC1, the user equipment 100 transmits a handover complete message for the component carrier CC1 to the base station 200*b* (step S142). Receiving the handover complete message, the base station 200*b* requests the MME to perform route update for the component carrier CC1 of the user equipment 100 (step S144). Upon updating the route of user data by the MME, the user equipment 100 becomes able to communicate with another device through a new base station (i.e. the base station 200*b*). Note that the request for route update may be performed with respect to each component carrier, or performed only once through a plurality of component carriers. Then, the base station 200*b* transmits acknowledgement for the handover complete message to the user equipment 100 (step S146).

Further, referring to FIG. 9B, the user equipment 100 transmits a measurement report for the component carrier CC2 to the base station 200*a* (step S152). Receiving the measurement report, the base station 200*a* transmits a handover request message for the component carrier CC2 to the base station 200*b* (step S154).

Receiving the handover request message, the base station 200*b* allocates the component carrier CC2 to any frequency band for the new communication channel with the user equipment 100 according to the availability of a communication service. In this scenario, it is assumed that the frequency band to which the component carrier CC2 is allocated is the frequency band which is adjacent to the component carrier CC1 or the frequency band in which the distance from the component carrier CC1 in the frequency direction is smaller than the threshold $F_{TH}$. After that, the base station 200*b* transmits a handover request confirm message to the base station 200*a* (step S156). Receiving the handover request confirm message, the base station 200*a* transmits a handover command for the component carrier CC2 to the user equipment 100 (step S158).

Then, in the user equipment 100 which has received the handover command, the control unit 160 reads the timing adjustment value for the component carrier CC1 which is stored in the adjustment value storage unit 162. The control unit 160 then adjusts the access timing to the base station 200*b* for the component carrier CC2 by using the timing adjustment value which is read from the adjustment value storage unit 162 (step S164). During this period, the base station 200*a* forwards data addressed to the user equipment 100 to the base station 200*b* (step S166).

The user equipment 100 then transmits a handover complete message for the component carrier CC2 to the base station 200*b* (step S172). Receiving the handover complete message, the base station 200*b* requests the MME to perform route update for the component carrier CC2 of the user equipment 100 (step S174).

Then, the base station 200*b* transmits acknowledgement for the handover complete message to the user equipment 100 (step S176).

(3-4. Summary of First Embodiment)

The first embodiment of the present invention is described above with reference to FIGS. 5 to 9B. According to the embodiment, in a radio communication involving the carrier aggregation, when a distance in the frequency direction between two or more component carriers which are allocated to a communication channel with a target base station is smaller than a specific threshold, the user equipment 100 skips a random access to the target base station for at least one of the two or more component carriers. Therefore, an accumulation of delays corresponding to the number of component carriers due to a failure of a random access does not occur, and the degradation of service quality caused by a random access during a handover procedure is suppressed. Further, the user equipment 100 adjusts the transmission timing for the component carrier for which a random access has been skipped by using the timing adjustment value notified from the target base station for the component carrier for which a random access has been made. A communication can be thereby performed at appropriate timing also in the component carrier for which a random access has been skipped. Further, because it is not necessary in the target base station to redundantly determine the timing adjustment value for the component carrier, the overhead of a communication is reduced.

Further, according to the embodiment, when two or more component carriers which are adjacent in the frequency direction are allocable, the base station 200 serving as a target base station allocates the two or more component carriers to a new communication channel with the user equipment 100. Further, when two or more component carriers whose distance in the frequency direction is smaller than a specific threshold are allocable, the base station 200 allocates the two or more component carriers to a new communication channel. The opportunity of skipping a random access by the user equipment 100 during a handover procedure thereby increases, and it is possible to more effectively obtain the above-described advantages such as prevention of an accumulation of delays due to a failure of a random access or reduction of overhead. Note that the positions in the frequency direction of those component carriers may be varied after the end of a series of handover procedure as a matter of course.

4. Description of Second Embodiment

A second embodiment of the present invention for making a more efficient random access during a handover procedure in a radio communication involving the carrier aggregation is described hereinafter with reference to FIGS. 10 to 12B.

(4-1. Exemplary Configuration of User Equipment)

FIG. 10 is a block diagram showing an example of a configuration of the user equipment 300 according to the embodiment. Referring to FIG. 10, the user equipment 300 includes a radio communication unit 110, a signal processing unit 150, a control unit 360, and a measurement unit 170.

(Control Unit)

The control unit 360 controls the overall functions of the user equipment 300 by using a processing device such as a CPU or a DSP. For example, the control unit 360 controls the timing of data communication by the radio communication unit 110 according to scheduling information that is received from the base station 400 by the radio communication unit 110. Further, the control unit 360 controls the measurement unit 170 to measure the channel quality by using a reference signal from the base station 400, which is a serving base station, and transmits the channel quality report to the base station 400 through the radio communication unit 110. Further, the control unit 360 controls the measurement unit 170 to execute measurement during the periods of measurement gaps which are allocated by the base station 400.

Further, in this embodiment, when one or more component carriers are allocated to a new communication channel by the base station 400 during a handover procedure, the control unit 360 controls the radio communication unit 110 to make a random access to the base station 400. By a random access for the one or more component carriers, a new communication channel with the base station 400 is established. Then, the control unit 360 controls the radio communication unit 110 to notify the base station 400 of the timing of a random access for one or more other (remaining) component carriers to constitute the communication channel over the established new communication channel. The base station 400 as a target base station can thereby reserve communication resources necessary in the random access procedure by the user equipment 300 in advance based on the notified timing.

(4-2. Exemplary Configuration of Base Station]

FIG. 11 is a block diagram showing an example of a configuration of the base station 400 according to the embodiment. Referring to FIG. 11, the base station 400 includes a radio communication unit 210, an interface unit 250, a CC management unit 260, and a control unit 480.

(Control Unit)

The control unit 480 controls the overall functions of the base station 400 by using a processing device such as a CPU or a DSP. For example, the control unit 480 executes an allocation of communication resources for data communication for the user equipment 300 and other user equipments. Then, the control unit 480 delivers scheduling information over a broadcast channel in a given sub-frame. Further, when the base station 400 is a target base station of a handover by the user equipment 300, the control unit 480 sequentially allocates two or more component carriers to a new communication channel with the user equipment 300. At this time, over the new communication channel which is established by a random access for one or more component carriers, the timing of a random access for one or more other component carriers to constitute the communication channel can be notified from the user equipment 300 as described above. Receiving such a notification, the control unit 480 reserves communication resources for the user equipment 300 according to the notified timing so that the subsequent random access for the one or more other component carriers succeeds. The communication resources reserved thereby include resources of an uplink for a connection request from the user equipment 300, resources of a downlink for acknowledgement to the connection request or the like.

In addition to such a reservation of communication resources, the control unit 480 controls the base station 400 to operate in the same manner as the source base station or the target base station in the handover procedure which is descried with reference to FIG. 1.

(4-3. Flow of Process)

A flow of a handover procedure according to the embodiment is described hereinafter with reference to FIGS. 12A and 12B. Note that, in the following scenario, it is assumed that a handover procedure is performed among the user equipment 300, the base station 400$a$ serving as a source base station, and the base station 400$b$ serving as a target base station. Further, like FIGS. 9A and 9B, for simplification of description, it is assumed in this scenario that the user equipment 300 performs a radio communication by using two component carriers. Furthermore, for the procedure up to measurement in the user equipment (steps S2 to S14) in the typical handover procedure illustrated in FIG. 1, explanation is omitted because there is no significant difference.

Referring to FIG. 12A, the user equipment 300 first transmits a measurement report for the component carrier CC1, for example, to the base station 400a (step S222). Receiving the measurement report, when the base station 400a determines that a handover is necessary, the base station 400a transmits a handover request message for the component carrier CC1 to the base station 400b (step S224). Receiving the handover request message, the base station 400b allocates the component carrier CC1 to any frequency band for a new communication channel with the user equipment 300 according to the availability of a communication service. Then, the base station 400b transmits a handover request confirm message to the base station 400a (step S226). Receiving the handover request confirm message, the base station 400a transmits a handover command for the component carrier CC1 to the user equipment 300 (step S228).

Receiving the handover command, the user equipment 300 first acquires synchronization with the downlink channel of the component carrier CC1 of the base station 400b (step S232). Then, the user equipment 300 makes a random access to the base station 400b by using a random access channel of the component carrier CC1 (step S234). When the random access is success, a new communication channel between the user equipment 300 and the base station 400b is established. During the downlink synchronization and the random access, the base station 400a forwards data addressed to the user equipment 300 to the base station 400b (step S236).

Then, after success in the random access for the component carrier CC1, the user equipment 300 transmits a handover complete message for the component carrier CC1 to the base station 400b (step S242). Receiving the handover complete message, the base station 400b requests the MME to perform route update for the component carrier CC1 of the user equipment 300 (step S244). Then, the base station 400b transmits acknowledgement for the handover complete message to the user equipment 300 (step S246).

Further, referring to FIG. 12B, the user equipment 300 transmits a measurement report for the component carrier CC2 to the base station 400a (step S252). Receiving the measurement report, the base station 400a transmits a handover request message for the component carrier CC2 to the base station 400b (step S254).

Receiving the handover request message, the base station 400b allocates the component carrier CC2 to any frequency band for the new communication channel with the user equipment 300 according to the availability of a communication service. The frequency band to which the component carrier CC2 is allocated may be any frequency band. After that, the base station 400b transmits a handover request confirm message to the base station 400a (step S256). Receiving the handover request confirm message, the base station 400a transmits a handover command for the component carrier CC2 to the user equipment 300 (step S258).

Then, the user equipment 300 notifies the timing of a random access (RA) for the component carrier CC2 to the base station 400b over the established new communication channel (which has the component carrier CC1) (step S260). The base station 400b then reserves communication resources according to the notified timing so that a random access for the component carrier CC2 by the user equipment 300 does not fail due to the shortage of communication resources (step S261).

After that, the user equipment 300 acquires synchronization with the downlink channel of the component carrier CC2 of the base station 400b (step S262). Then, the user equipment 300 makes a random access to the base station 400b by using a random access channel of the component carrier CC2 at the timing notified to the base station 400b in the step S260 (step S264). Such a random access is likely to succeed unless signal collision occurs because communication resources for a connection request from the user equipment 300 and acknowledgement for the request are reserved by the base station 400b. During the downlink synchronization and the random access, the base station 400a forwards data addressed to the user equipment 300 to the base station 400b (step S266).

The user equipment 300 then transmits a handover complete message for the component carrier CC2 to the base station 400b (step S272). Receiving the handover complete message, the base station 400b requests the MME to perform route update for the component carrier CC2 of the user equipment 300 (step S274). Then, the base station 400b transmits acknowledgement for the handover complete message to the user equipment 300 (step S276).

(4-4. Summary of Second Embodiment)

The second embodiment of the present invention is described above with reference to FIGS. 10 to 12B. According to the embodiment, at the time of a handover in a radio communication involving the carrier aggregation, the timing of a random access for a component carrier for which a handover has not been completed is notified from the user equipment 300 to the base station 400 over a component carrier for which a handover has been completed. The base station 400 can thereby reserve communication resources so that the subsequent random access for another component carrier from the user equipment 300 does not fail due to the shortage of communication resources. As a result, the possibility of a failure of a random access is reduced, and the degradation of service quality due to an accumulation of delays is suppressed.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Radio Communication System
100, 300 User Equipment
110 Radio Communication Unit (User Equipment)
160, 360 Control Unit (User Equipment)
200, 400 Base Station
210 Radio Communication Unit (Base Station)
280, 480 Control Unit (Base Station)

The invention claimed is:

1. A mobile station in a wireless communication network, comprising:
a radio communication interface configured to communicate with a base station via a communication channel formed by aggregating a plurality of component carriers;
processing circuitry configured to control a handover from a first base station to a second base station by the radio communication interface, and to skip a random access, to the second base station, on at least one of two or more component carriers; and an adjustment value memory configured to store a timing adjustment value notified for a component carrier of the two or more component carriers on which random access is carried out;
wherein the processing circuitry is configured to adjust transmission timing on a component carrier on which a random access has been skipped by using the timing adjustment value stored in the memory.

2. The mobile station of claim 1, wherein
the processing circuitry is configured to acquire synchronization with the base station via the component carrier for which random access is carried out, and
the radio communication interface is configured to transmit an access request message based on the synchronization.

3. The mobile station of claim 1, wherein
the timing adjustment value is based on a signal propagation characteristic between the mobile station and the base station.

4. The mobile station of claim 1, wherein
the timing adjustment value depends on a frequency of the component carrier for which random access is carried out.

5. The mobile station of claim 1, wherein
the two or more component carriers are in closest proximity to each other relative to other available component carriers.

6. The mobile station of claim 1, wherein
the two or more component carriers are adjacent to each other.

7. The mobile station of claim 1, wherein
the two or more component carriers are within a predetermined threshold of each other.

8. A base station in a wireless communication network, the base station comprising:
a radio communication interface configured to communicate with a mobile station via a communication channel formed by aggregating a plurality of component carriers;
processing circuitry configured to control a handover of the mobile station from another base station,
wherein, the processing circuitry is configured to allocate two or more component carrier, and notify timing adjustment value to the mobile station for a component carrier of the two or more component carriers on which the mobile station carries out random access, and
wherein the radio communication interface is configured to receive information, about a component carrier of the two or more component carriers for which random access is skipped, transmitted from the mobile station on a transmission timing adjusted by the mobile station using the timing adjustment value notified for the component carrier on which the mobile station carries out random access.

9. The base station of claim 8, wherein
the processing circuitry is configured to assign the two or more component carriers to be adjacent to each other.

10. The base station of claim 8, wherein
the processing circuitry is configured to assign the two or more component carriers be within a predetermined threshold to each other.

11. The base station of claim 8, wherein
the processing circuitry is configured to assign a second component carrier of the two or more component carriers, which is one of a plurality of available component carriers closest in proximity to a first component carrier of the two or more component carriers.

12. A wireless communication system comprising:
a mobile station;
a first base station; and
a second base station,
wherein the mobile station includes:
a first radio communication interface configured to communicate with the second base station via a communication channel formed by aggregating a plurality of component carriers; and
a first control unit configured to control a handover from the first base station to the second base station by the first radio communication interface, and to skip a random access, to the second base station, on at least one of two or more component carriers; and
an adjustment value memory configured to store a timing adjustment value notified for a component carrier of the two or more component carriers on which random access is carried out;
wherein the first control unit is configured to adjust transmission timing on a component carrier on which a random access has been skipped by using the timing adjustment value stored in the adjustment value memory, and
the second base station includes:
a second radio communication interface configured to communicate with a mobile station via a communication channel formed by aggregating a plurality of component carriers;
a second control unit configured to control a handover of the mobile station from the first base station,
wherein, the second control unit is configured to allocate two or more component carrier, and notify timing adjustment value to the mobile station for a component carrier of the two or more component carriers on which the mobile station carries out random access, and
wherein the second radio communication interface is configured to receive information, about a component carrier of the two or more component carriers for which random access is skipped, transmitted from the mobile station on a transmission timing adjusted by the mobile station using the timing adjustment value notified for the component carrier on which the mobile station carries out random access.

13. A method executed by a mobile station in a wireless communication network comprising:
communicating with a base station via a communication channel formed by aggregating a plurality of component carriers;
controlling a handover from a first base station to a second base station;
skipping a random access, to the second base station, on at least one of two or more component carriers;
storing a timing adjustment value notified for a component carrier of the two or more component carriers on which random access is carried out; and
adjusting transmission timing on a component carrier on which a random access has been skipped by using the stored timing adjustment value.

14. A method executed by a base station in a wireless communication network comprising:
communicating with a mobile station via a communication channel formed by aggregating a plurality of component carriers;
controlling a handover of the mobile station from another base station;
allocating two or more component carrier, and notify timing adjustment value to the mobile station for a component carrier of the two or more component carriers on which the mobile station carries out random access; and receiving information, about a component carrier of the two or more component carriers for which random access is skipped, transmitted from the mobile station on a transmission timing adjusted by the mobile station using the timing adjustment value notified for the component carrier on which the mobile station carries out random access.

* * * * *